United States Patent [19]

Appel

[11] Patent Number: 4,899,289
[45] Date of Patent: Feb. 6, 1990

[54] APPARATUS FOR AND METHOD OF PROCESSING SIGNALS IN A COMPOSITE WAVEFORM INCLUDING NOISE AND A PERIODIC COMPONENT

[75] Inventor: Jean Appel, Vanves, France

[73] Assignee: Office National d'Etudes et de Recherche Aerospatiales, Chatillon, France

[21] Appl. No.: 114,748

[22] Filed: Oct. 30, 1987

[30] Foreign Application Priority Data

Oct. 31, 1986 [FR] France ................ 86 15250

[51] Int. Cl.$^4$ .............. G06G 7/19; G01R 23/02
[52] U.S. Cl. .................... 364/484; 324/77 G; 324/78 F; 356/27; 377/21
[58] Field of Search ............... 364/480, 481, 484, 485, 364/565; 324/77 G, 77 R, 78 F; 340/606, 670; 377/22; 356/27

[56] References Cited

U.S. PATENT DOCUMENTS

| | | | |
|---|---|---|---|
| 3,621,220 | 11/1971 | Ford, Jr. | 324/77 G |
| 3,646,333 | 2/1972 | Pryor, Jr. | 324/77 G |
| 4,403,184 | 9/1983 | Witt et al. | 364/484 |
| 4,786,168 | 11/1988 | Meyers et al. | 324/77 R |

OTHER PUBLICATIONS

ICIASF '85 RECORD: "Fast Digital Data Acquisition and Analysis of LDA Signals by Means of a Transfer Recorder and an Array Processor", by D. Pallek et al, pp. 309–312.
Third Int'l. Symposium of Appl. of Laser Anemometry to Fluid Mechanic: "Frequency Domain Laser Velocimeter Signal Processor", by F. Mayers et al, 3.6, pp. 1–6.

Primary Examiner—Bruce Y. Arnold
Assistant Examiner—Terry S. Callaghan
Attorney, Agent, or Firm—Lowe, Price, LeBlanc, Becker & Shur

[57] ABSTRACT

The occurrence and frequency of a periodic component embedded in a composite waveform including noise is detected by real time calculating the autocorrelation function of the waveform and deducing the frequency of the periodic component from the value of the autocorrelation function coefficients. An analog-to-digital converter periodically transforms the waveform into samples having q bits. The samples are delayed by a predetermined time interval $\Delta t$ and multiples thereof, to derive 2n delayed samples, $x_i, x_{i-1} \ldots x_{i-2n}$. The delayed samples are multipled to derive 2n products, such that the first n products are represented by $x_1 \cdot x_{i-k}$ and the second n products are represented by $x_{1-n} \cdot x_{i-(n+k)}$, where k is selectively $1 \ldots n$. Difference between the first and second products are obtained as $(P_1 - P_{n+1}) \ldots (P_{n-1} - P_{2n})$, where $P_1 = x_i \cdot x_{i-1}$, $P_{n-1} = x_i \cdot x_{i-n}$, $P_{+1} = x_{i-n} \cdot x_{i-n+1}$, $P_{2n} = x_{i-n} \cdot x_{i-2n}$. The differences are integrated to derive autocorrelation funtion coefficients of the input signal. In response to at least one of the coefficients exceeding a predetermined threshold, an indication that the input signal contains a periodic component is derived.

3 Claims, 8 Drawing Sheets

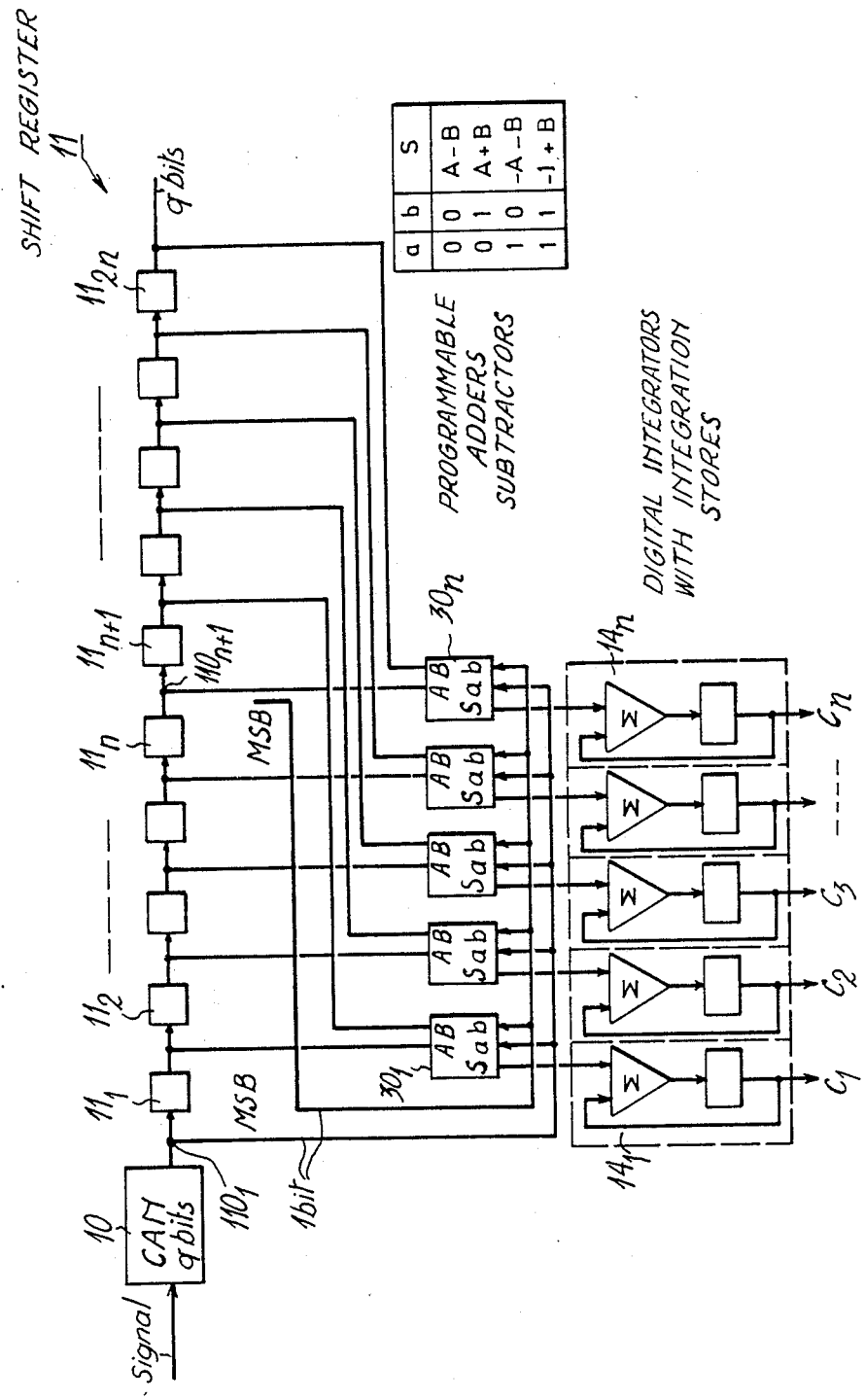

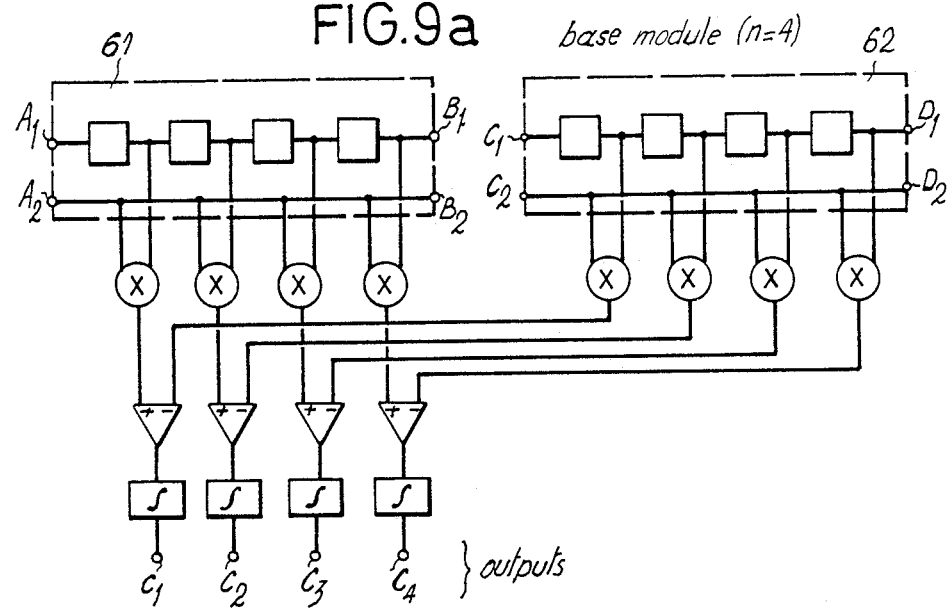
FIG. 9a  base module (n=4)
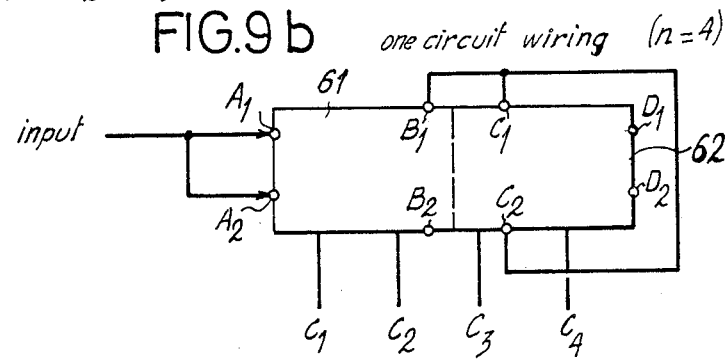
FIG. 9 b  one circuit wiring (n=4)
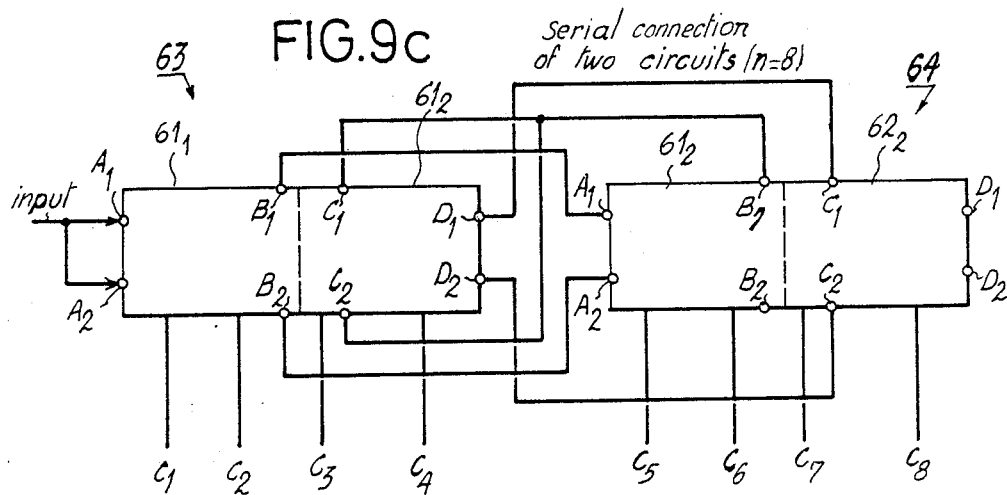
FIG. 9c  serial connection of two circuits (n=8)

APPARATUS FOR AND METHOD OF PROCESSING SIGNALS IN A COMPOSITE WAVEFORM INCLUDING NOISE AND A PERIODIC COMPONENT

BACKGROUND OF THE INVENTION

1. Field of the Invention

This invention relates to a device whereby noise can be extracted from short duration periodic signals succeeding each other at random intervals. The device can be applied to fringe laser velocimetry in order to measure the instantaneous rate of flow of gases or liquids, using particles carried by the fluid as a tracer; these particles have a dimension of around 1 micron and are most often introduced artificially.

More generally speaking the invention concerns a system of processing signals whereby it is possible to detect and frequency analyze, in real time, short duration periodic signals drowned in noise and having unforeseeable occurrence times.

To measure the flow rate of a fluid by fringe laser velocimetry, a network of interference fringes is formed by intersecting two laser beams at a given point in the flow; the point is referred to as "test volume". A particle traversing the test volume encounters successively clear and obscure parts of the fringes and diffuses light in all directions.

A photomultiplier having a field of view directed at the test volume therefore is responsive to light flux modulated sinusoidally at a frequency:

$$f = v/i \qquad (1)$$

in which v is the speed of the particles and i the pitch between fringes.

This modulated signal has a Gaussian envelope representing the intensity distribution of the luminous flux in the test volume. After high-pass filtering, the signal derived by the photomultiplier can be expressed as:

$$s(t) = a \cdot \cos \omega t \cdot \exp(-t^2/2\sigma^2) \qquad (2)$$

where
$\omega = 2\sigma/v$ and
$\sigma$: standard deviation of the Gaussian envelope.

A more or less intensive noise b(t) is generally superposed on the signal s(t) according to the position of the test volume in relation to walls guiding the flow, and according to the way in which the photomultiplier receives the luminous flux (prior or back diffusion, ...).

2. Description of the Prior Art

There are two main classes of speed measuring devices which produce substantially different results:

1. Global testing, over a large number of particles, to provide a statistical estimate of average speed and its standard deviation characterizing turbulence;
2. Testing instantaneous speed of each particle to provide corresponding dating. The second class obviously has a higher performance because it provides access to other values (higher order moments, turbulence spectrum, etc., ...), as well as mean speed and its standard deviation. Moreover only these means provide access to the instantaneous speed vector in a bi-dimensional or tri-dimensional mode. The system of the invention is in this latter category.

In systems for globally analyzing a sample of N particles, the signal derived by the photomultiplier can be recognized by responding with analog circuitry to different frequency bands. In the spectrum thus obtained from the photodetector output signal, the white noise results in a continuous signal whereas the useful signal results in a more or less wide peak according to the flow turbulence energy. This method, while being relatively immune to noise, is not very fast or accurate.

A digital spectral analysis can also be performed either via a band-pass scanning filter, or via plural parallel filters. The system is more accurate but is slow (if only one filter is used), or costly (in the event of plural parallel filters).

A real time digital correlator can be used to extract, from the "useful signal plus white noise" sum, a periodic useful component. Because white noise only affects the first coefficient of the signal autocorrelation function, it is simply necessary to acquire the $C_n \neq 0$ correlation to extract the signal from the noise.

Average speed and turbulence intensity can be deduced directly from the autocorrelation function, but it is easier to first form the Fourier transform and determine these values from the power spectrum. The commercial, MALVERN correlator uses this principle, digitizing the signal with only one bit.

To measure instantaneous speed it is necessary with previously used devices to detect the occurrence time of a particle passing through the test volume. The different systems in the second category can be therefore singled out, firstly, by the way in which this detection is made and secondly, by estimating the frequency of the useful signal, hence the speed of the particles.

The method most currently used in laser velocimetry of this type is the so-called "counting" method. The useful signal is detected by comparing its amplitude to a threshold; its frequency is measured by counting the number of pulses derived from a high speed clock over a certain number of periods of the frequency to be measured.

This method is relatively accurate (although limited by the maximum frequency of the counting clock: 500 MHz) but it is ineffective when noise level rises. In fact, signal zero crossings are not significant.

A prior art spectral analysis method is the subject of Dieter Pallek's article on the DFVLR "Fast Digital Data Acquisition and Analysis of LDA Signals by Means of a Transient Recorder and an Array Processor" published in the ICIASF'85 Record. When the amplitude of the signal exceeds a certain threshold, a portion of the signal is acquired, in a pre-activated mode, having a duration corresponding approximately to the time required for the particle to cross the test volume. Then a Fourier transform of the signal is made and its power spectrum calculated via a parallel "array processor" computer.

This method is relatively immune to noise but requires the presence of the useful signal to produce an increase of the global level detectable via a threshold. This method is therefore difficult to apply when the signal/noise ratio is relatively low. Moreover the sysotem is not very fast and is relatively costly.

Another method of spectral analysis is described in the article "Frequency Domain Laser Velocimeter Signal Processor," James F. Meyer, published in the Proceedings of the "Third International Symposium on Applications of Laser Anemometry to Fluid Mechanics." This technique has a high performance because it detects an energy threshold, instead of detecting a signal amplitude threshold that is sensitive to the noise.

The system calculates the energy of the signal continuously over a constant time window T. If this energy exceeds a certain threshold, it is assumed that a particle passing the window has been detected. The corresponding signal is stored, then applied to an input of plural, parallel band-pass filters to determine frequency. To calculate energy, the signal is digitized as one bit; for the filtering it is digitized as two bits.

As the number of band-pass filters is not very high, one acts iteratively on the sampling frequency to obtain a maximum energy from the central filter. A certain number of particles of the same speed are therefore required to converge.

The MEYERS method described above has two drawbacks:

a. While the "threshold" applied to the energy contained in the time window T of the signal is better than that applied to the amplitude, it incorrectly assumes that the noise energy in the window is always relatively constant. Moreover, in the presence of a strong noise component, the noise difference between the energy and the "noise plus signal" can be slight which makes "thresholding" delicate;

b. The system requires a learning period to adapt the sampling rate to the frequency of the signal to adjust the filter response curve to this same frequency.

As a result the measurement is not strictly instantaneous.

SUMMARY OF THE INVENTION

The present invention remedies these two drawbacks, with the assumption that the noise is white by providing a threshold for an autocorrelation function of the signal instead of a comparison for an energy threshold. The autocorrelation function has non-zero values, for delays different from zero, for useful signals and noise, respectively. A frequency estimate is obtained by discrete Fourier transform (DFT) scanning a restricted frequency range estimated roughly from the first zero crossing of the autocorrelation function. The speed of each particle can therefore be calculated.

Theoretical Justification

A periodic signal s(t) drowned in white noise can be detected from the autocorrelation function $$C(\tau) = \int_{-\infty}^{+\infty} s(t) \cdot s(t - \tau) dt,$$

which is limited in practice to $$C_T(\tau) = \int_{t_o}^{t_o + T} s(t) \cdot s(t - \tau) dt \qquad (3)$$

because the analysis duration is limited to T.

In the case in question s(t) can, in an initial approximation, be modeled for a particle by:

$$s(t) = b(t) + a \cdot \cos \omega t \cdot \exp(-t^2/2\sigma^2),$$

where
  b(t) is white noise, $\omega$ is angular frequency of the useful signal, and $\exp(-t^2/2\sigma^2)$ is the Gaussian envelope or error function of the useful signal.

In fact, s(t) corresponds to the output of the photomultiplier after high-pass filtering.

The autocorrelation function of s(t) is:

$$C(\tau) = k\delta(0) + a\sigma \frac{\sqrt{\pi}}{2} \cdot \exp(-\tau^2/2(\sqrt{2\sigma})^2) \cdot \cos\omega\tau \qquad (4)$$

$\delta(0)$ is a Dirac pulse centered at the origin (autocorrelation of the noise). It can be seen here that $C(\tau)$ has a periodic component $\cos \omega\tau$ having the same angular frequency as s(t). On $C(\tau)$, the measurement of $\omega$ is more accurate because the whole noise is reduced to the origin in the form of a Dirac pulse.

This method is already used (see the paragraph covering analysis by correlation) by integrating in the calculation of $C(\tau)$, a great number of "bursts" (one "burst" = signal corresponding to the passage of a particle). The Fourier transform of $C(\tau)$ which is the power spectrum of s(t), provides a distribution velocity in terms of probability density. But the concepts of instantaneous speed and simultaneity (in bi-dimensional and tri-dimensional modes) are lost.

An object of the invention is to modify the correlation method so it can store instantaneous speeds.

To do so, a sliding time autocorrelation function having a constant integration duration T is calculated; T is of the order of magnitude of the duration of a "burst." We consider for example $T = 2\delta_M$, where $\delta_M$ is the mean standard deviation of the Gaussian envelope of the "burst." Thus $$C_T(t,\tau) = \int_{t-T}^{t} s(t) \cdot s(t - \tau) dt \qquad (5)$$

if $t_o$ designates an arbitrary time origin, prior to the start of the measurement, we obtain:

$$\begin{aligned} C_T(t,\tau) &= \int_{t_o}^{t} s(t) \cdot s(t - \tau) dt - \\ &\quad \int_{t_o}^{t-T} s(t) \cdot s(t - \tau) dt \\ &= \int_{t_o}^{t} s(t) \cdot s(t - \tau) dt - \\ &\quad \int_{t_o+T}^{t} s(t - T) \cdot s(t - T - \tau) dt \end{aligned} \qquad (6)$$

By assuming that $s(t-T)=0$, where $t_o < t < t_o + T$ (which means that the signal and noise are zero for the time preceding time $t=0$), $$C_T(t,\tau) = \int_{t_o}^{t} [s(t) \cdot s(t - \tau) - s(t - T) \cdot s(t - T - \tau)] dt \qquad (7)$$

In a sampling process, as occurs in digital signal handling, this relation becomes:

$$C_n(i,k) = \sum_{i=0}^{K} (x_i \cdot x_{i-k} - x_{i-n} \cdot x_{i-n-k}) \qquad (8)$$

$C_n(i,k)$ is the present correlation coefficient for a delay $k\Delta t$, calculated for a signal time window of duration $n\Delta t$, wherein the origin of window is time $i-n\Delta t$, where $x_i=0$ for $i<0$.

Generally speaking k is varied from 1 to n. The first n correlation coefficients are therefore available (C(0) is not calculated).

To make the corresponding calculations, Equation (8) shows that it is necessary to dispose of $x_i$, the last sampled value, and of the 2n previous samples.

BRIEF DESCRIPTION OF THE DRAWINGS

The invention is now described in detail in relation to the drawings appended in which:

FIG. 7 is a circuit diagram of another sliding correlator;

FIG. 9 is a block diagram of the two correlators connected in series to double the number of correlation coefficients.

DETAILED DESCRIPTION

Figure 1:
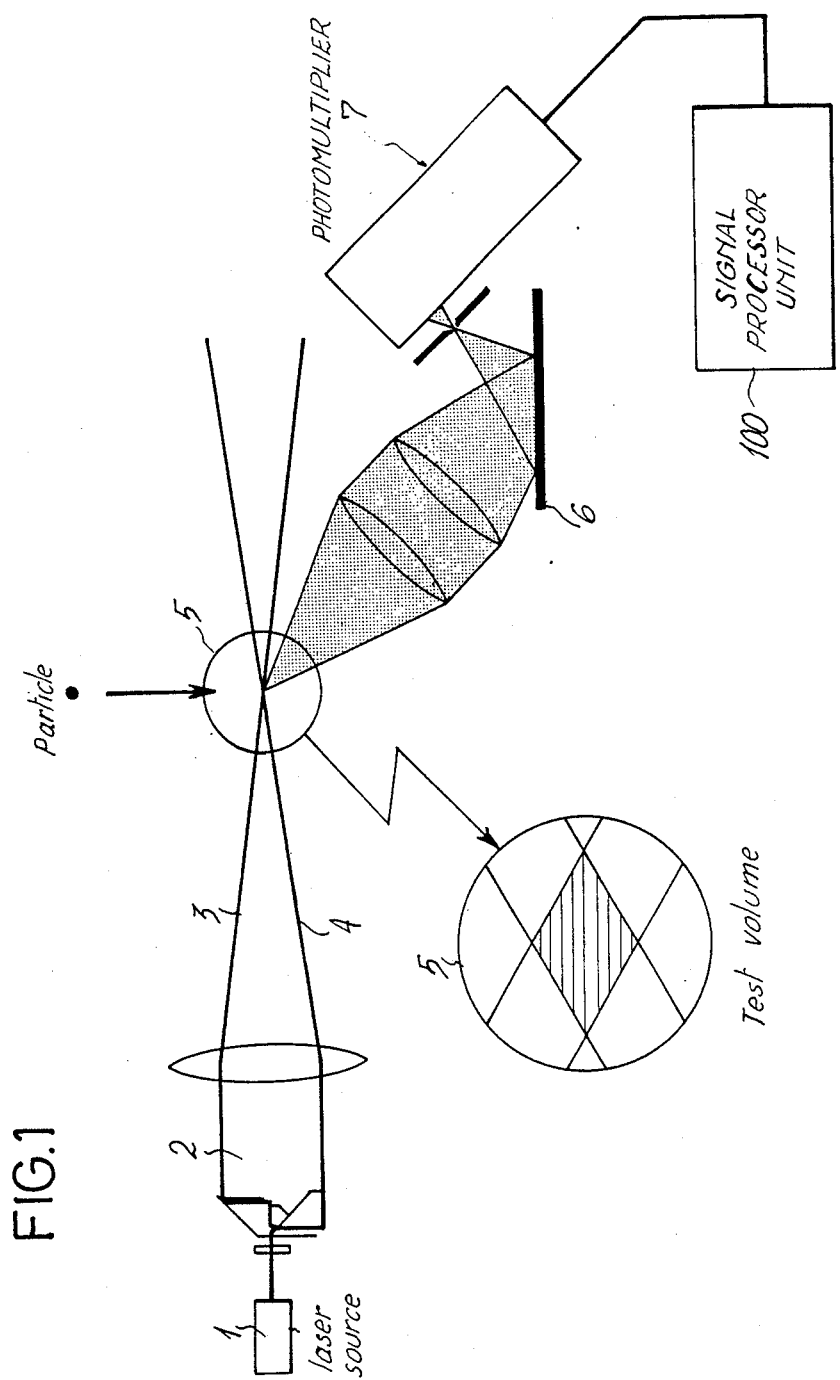
FIG. 1 is a fringe laser velocimetry device in accordance with a preferred embodiment of the invention.

Referring to FIG. 1, the fringe laser velocimeter includes a laser source 1 producing a coherent beam 2 that is divided into two beams 3 and 4 which interfere with each other in the test volume 5. The luminous flux emitted by the test volume 5 is incident on a mirror 6 which projects it on a photomultiplier 7. The output of the photomultiplier 7 is coupled to a signal processor unit 100, the subject of the present invention.

Figure 2:
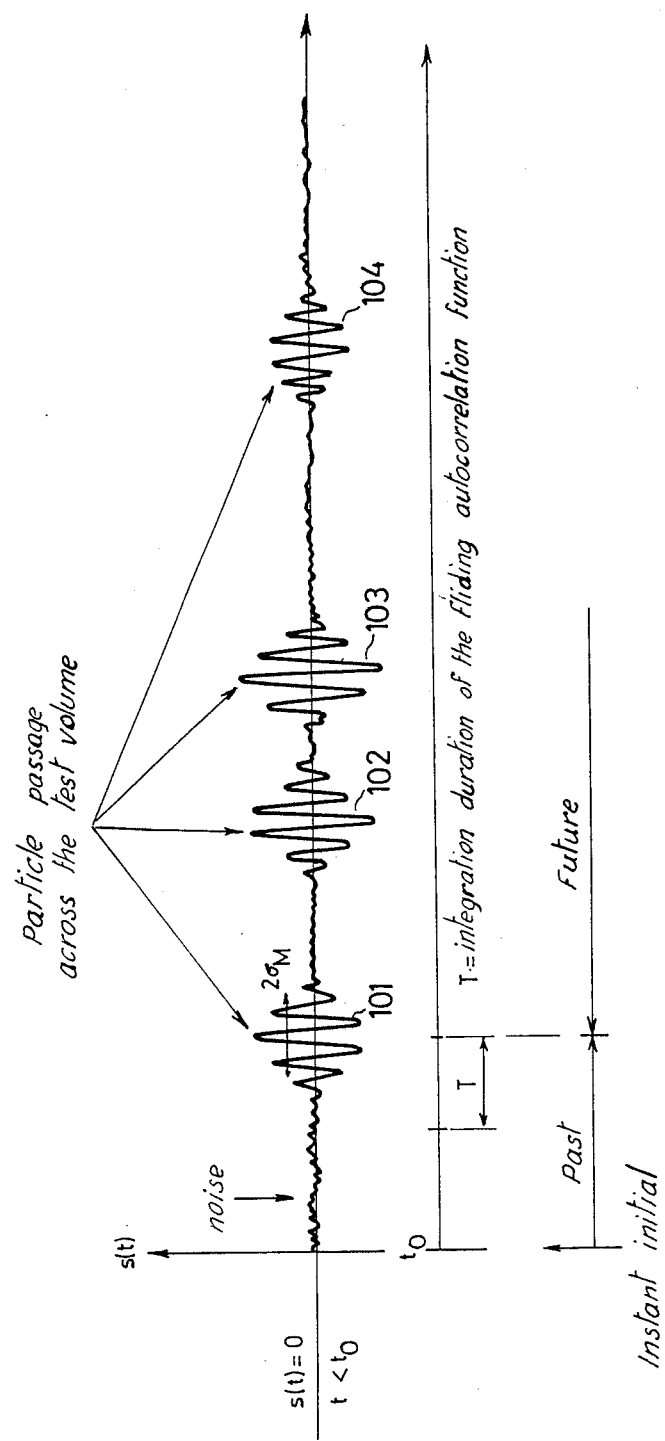
FIG. 2 includes a waveform for enabling the principle of sliding autocorrelation to be understood.

In FIG. 2 are shown four "bursts" 101 to 104. The integration duration T runs from (t−T) to t and ends at the present instant t.

The duration T can be stated $$(t_O-t)-[t_O-(t-T)]$$

or:

$$(t_O-t)-[(t_O+T)-t]$$

Figure 3:
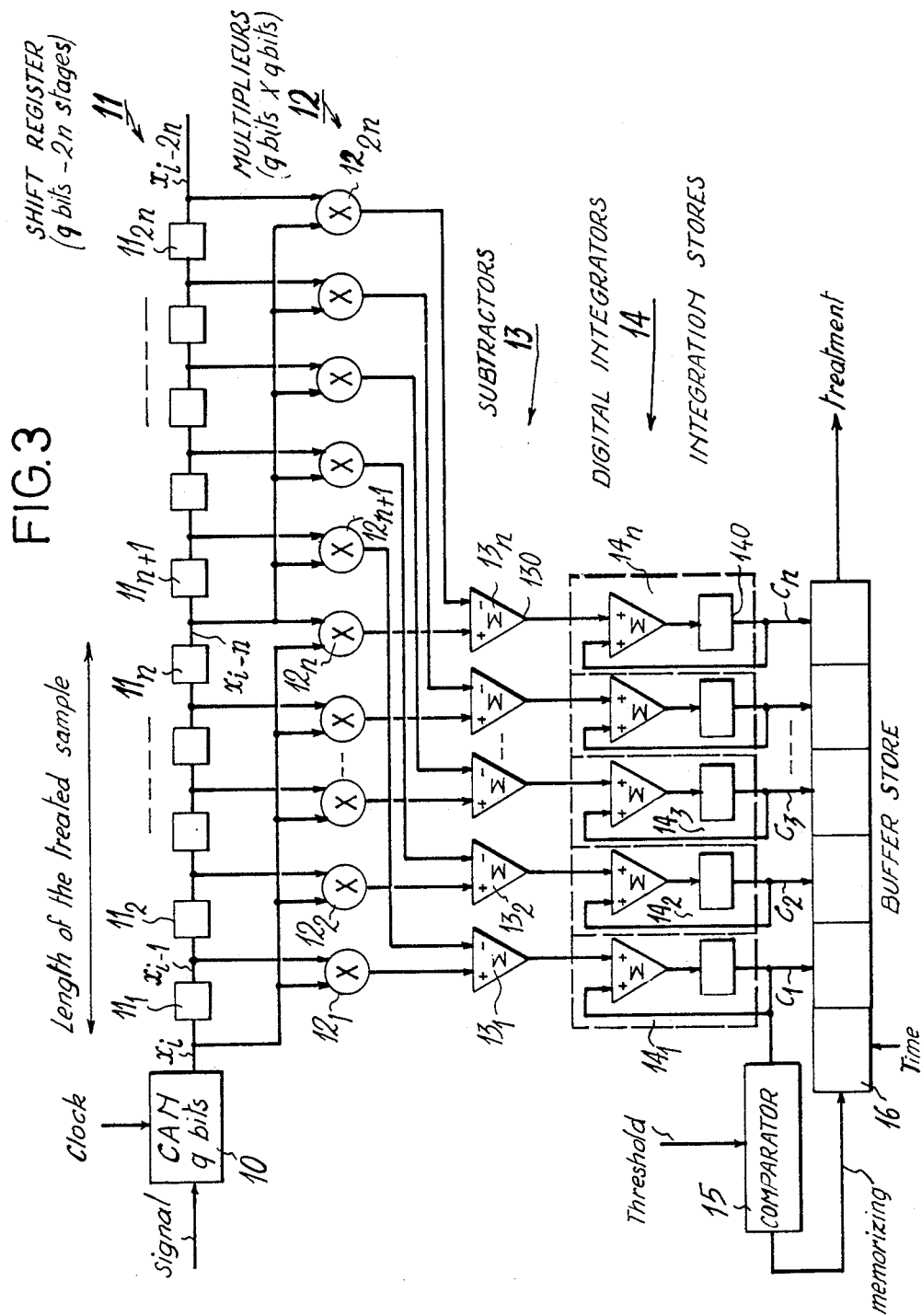
FIG. 3 is a circuit diagram of the sliding autocorrelator.

FIG. 3 is a block diagram of a correlator to calculate the relation of Equation (5).

An analog-to-digital converter 10 samples the output signal of photomultiplier 7 and converts it into a digital signal having q output bits for each sample. Converter 10, at time slot $i\Delta t$ (where $\Delta t$ is the interval between adjacent samples of the signal supplied to the converter) derives a binary signal having a value $x_i$, as represented by the q output bits for each sample. An initially reset shift register 11, having 2n stages $11_1$ to $11_{2n}$, stores all the delayed output bits of converter 10 so that each of the stages stores q bits at any time. The signal processing unit 100 includes n multipliers $12_1$ to $12_n$ each having two q bit inputs, for calculating the products $x_i \cdot x_{i-k}$ for k=1 ... n. ($x_i$: present output signal of converter 10; $x_{i-k}$ output signal of converter 10 that is delayed k samples from the signal $x_i$, the value of k is selectively 1 ... n). Unit 100 also includes n multipliers $12_{n+1}$ to $12_{2n}$, each having q bits, for calculating the products $x_{i-n} \cdot x_{i-n-k}$ for k=1 ... n (($x_{i-n}$) is the present signal delayed by $n\Delta t$, $x_{i-n-k}$ is the delayed signal that occurred (n+k) signals before signal $x_i$) Unit 100 comprises n subtractors $13_1$ to $13_n$ for calculating $(x_i \cdot x_{i-k}) - (x_{i-n} \cdot x_{i-n-k})$ for k=1 ... n. The signal at output 130 of each of these subtractors $13_1$ to $13_n$ is respectively integrated digitally by integrators $14_1$ to $14_n$. The signal at output 140 of the integrators $14_1$ to $14_n$ provides a real time estimate of the coefficients $C_1$ to $C_n$ of the autocorrelation function sliding over the duration $T=n \cdot \Delta t$, where $\Delta t$ is the time separation between adjacent output signals of converter 10.

The autocorrelation of FIG. 3 differs from the prior art as a result of the combination of stages $11_{n+1}$ to $11_{2n}$, register 11, multipliers $12_{n+1}$ to $12_{2n}$ and subtractors $13_1$ to $13_n$.

The criterion for detecting the presence of a "burst" is:

If white noise is superimposed on an information signal having a high signal-to-noise ratio, the passage of a particle is detected if one of the correlation coefficients $C_n \neq 0$ so that $n \geq 1$. In this situation, almost all the noise is contained in $C_O$. Generally speaking, $C_1$ is chosen and compared in a comparator 15 to a preprogrammed threshold S. If $C_1 > S$, comparator 15 activates an enable input of buffer register or store 6, to enable the buffer to store the n correlation coefficients. In response to $C_1$ dropping below the threshold, the system is reset.

In practice, in cases where the noise is very high compared to the signal, its autocorrelation function is calculated over a limited time. Under these circumstances, the signal can be assimilated to a Dirac pulse centered on the origin and offers residual "noise."

Figure 5:
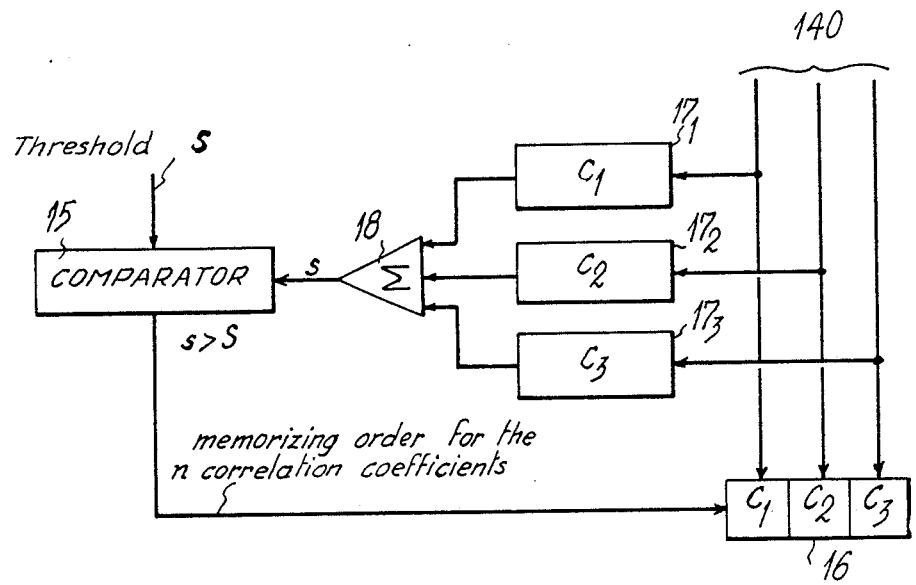
FIG. 5 is a circuit diagram of an examplary circuit using a burst detection criterion having three correlation coefficients.

To increase the signal-to-noise ratio for detecting the "burst," the threshold S is compared with a function of the sum of the first coefficients (for example $|C_1|+|C_2|$, or $|C_2|+|C_3|$, or $|C_1|+|C_2|+|C_3|$), as derived from digital integrators 14. In FIG. 5 are illustrated the output leads 140 of integrators $14_1$ to $14_3$ which supply signals representing coefficients $C_1$, $C_2$, and $C_3$ to correlation coefficient storage registers 16. Leads 140 are connected to amplitude detectors $17_1$, $17_2$, $17_3$, having outputs that are connected to an addition circuit 18, which in turn drives comparator 15. The comparator 15 controls readout of register 16 as in FIG. 3.

Figure 6:
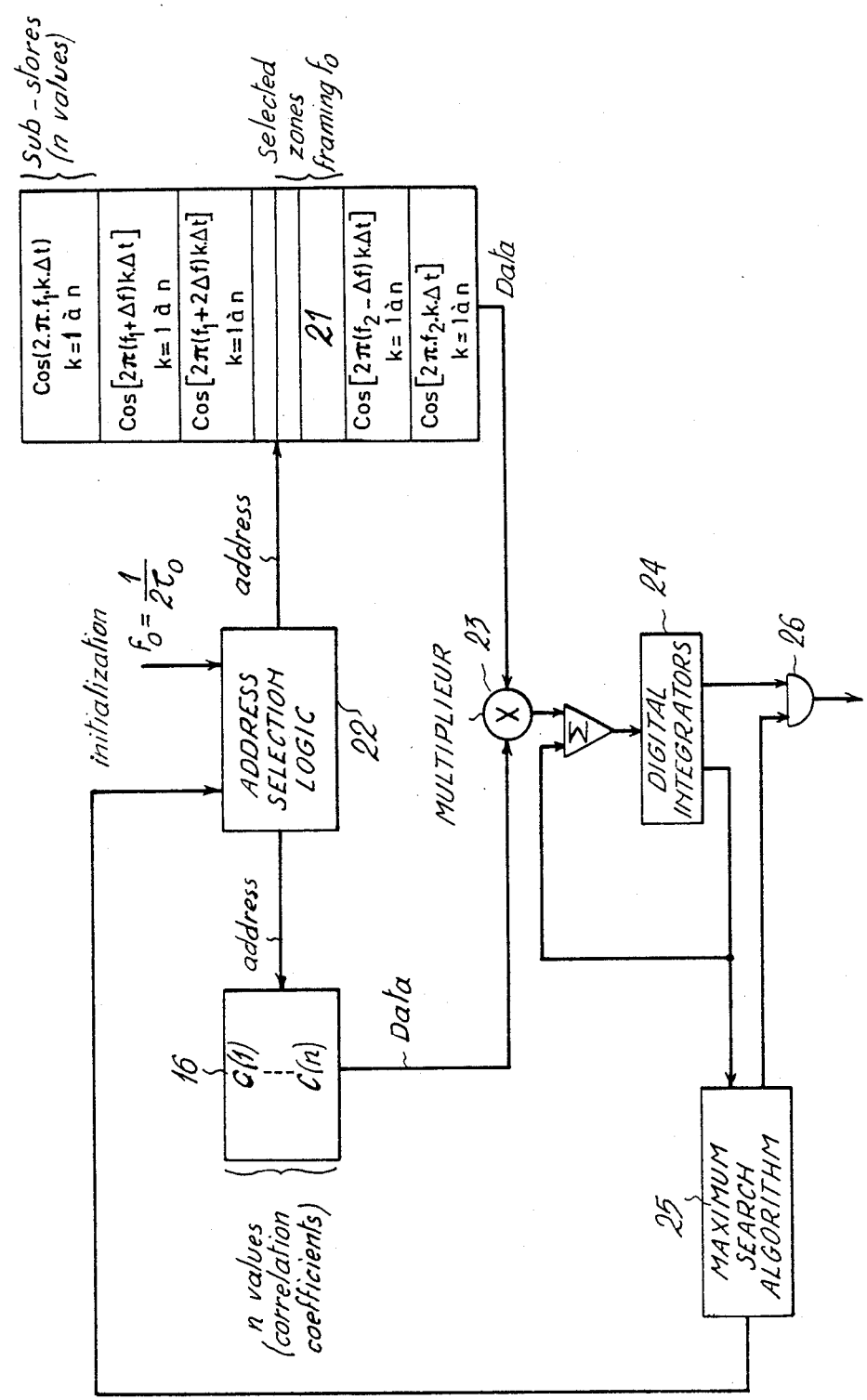
FIG. 6 is a block diagram of a device for determining the frequency of a "burst"

An estimate of frequency is derived from the n correlation coefficients with the apparatus of FIG. 6, based on the following principles.

The time $\tau_0$ when the correlation function first passes a zero crossing is detected. A rough estimate of frequency is $f_0=\frac{1}{2}\tau_O$ (this estimate can also be made by detecting several zero crossings of $C(\tau)$). The maximum of the function is sought:

$$P(f) = \sum_{k=1}^{n} C(k) \cdot \cos 2\pi f k \Delta t$$

by scanning f around $f_0$ with a required frequency or pitch; i.e., $f=f_0 \pm m\Delta f$.

The system described in FIG. 6 makes this estimate rapidly.

The n correlation coefficients $C_1$ to $C_n$ are stored in buffer register or memory 16 (FIG. 3). A table 21 contains the values representing cos $2\pi fk\Delta t$ for k varying from 1 to n and f varying from $f_1$ to $f_2$ by a pitch of $\Delta f$ ($f_1$ and $f_2$ are the limit frequencies corresponding to the limit speed contained in the flow and $\Delta f$ is the frequency resolution to be obtained). A "sub-store" is defined as a zone of n values for which f is constant.

A table 21 addresses selection logic 22, initialized by $f_o = \frac{1}{2}\tau_0$, selects a certain number of sub-stores having a frequency frame $f_0$.

For each of these sub-stores, the integral product is $$\sum_{k=1}^{n} C(k) \cdot \cos(2\pi \cdot f \cdot k \cdot \Delta t)$$

via a multiplier 23 in digital integrator 24.

The maximum value of P(f) corresponds to the value of f sought. The duration of this search obviously depends on the frequency or pitch adopted but, with a frequency resolution of around $10^{-3}$, a real time rate of a few kHz is possible.

Digital integrator 24 is connected to a maximum search circuit 25 which supplies signals to the address selection logic 22 and gate 26, having an output indicating the frequency derived by photomultiplier 7.

Figure 4:
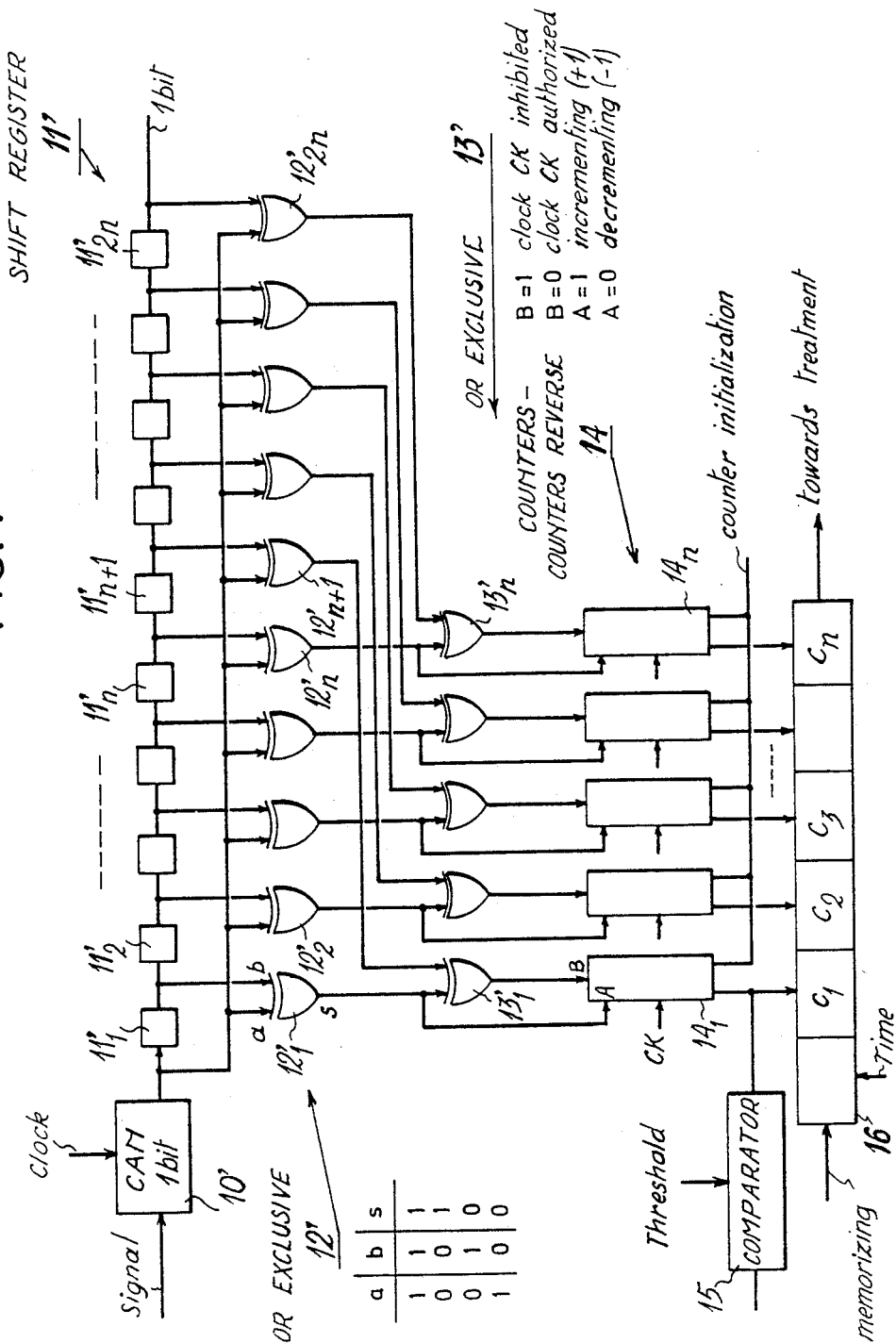
FIG. 4 is a circuit diagram of an embodiment of the sliding autocorrelator in FIG. 3.

The correlator in FIG. 4 corresponds to the case in which it suffices to estimate a correlation function by digitizing samples of the output signal s(t) of photomultiplier 7 as one bit. For such a device connector 10 derives one bit for each sample, so that, for example, its output is:

1 if s(t)>0

0 if s(t)<0.

Thus, the analog-to-digital converter 10' is a one-bit converter, instead of a multi-bit converter. Register stage 11 is a one-bit shift register. Multipliers 12, for q bits, are replaced by simple "exclusive OR" circuits 12'. Subtractors 13, for q bits, are also replaced by "exclusive OR" circuits 13'. The digital integrators 14 are counters—reverse counters in FIG. 4. These counters—reverse counters are latched by the subtractor exclusive OR gates $13_1'-13_n'$ and have an input responsive to a clock.

FIG. 7 is a circuit diagram of a q×1 bit correlator.

Signal s(t) from photomultiplier 7 is sampled and digitized as a q bit signal by converter 10. Each of bit output of converter 10, representing the values s(t) at each sampling time of the converter is stored in the different elements $11_1$ to $112_n$ of the shift register 11. The q bits of each signal are correlated with the most significant bit extracted from input $110_1$ of store $11_1$ and input $110_{n+1}$ of store $111_{n+1}$. The most significant bit of each of q bit output signal of converter 10 represents the polarity, i.e., sign, of the output of photomultiplier 7 at the time a sample is taken by converter 10.

The quantity to be calculated is $$\sum_{i=1}^{n} (S_i x_{i-k} - S_{i-n} x_{i-n-k})$$

where $S_i$ and $S_{i-n}$ are the sign bits on inputs $110_1$ and $110_{1-n}$. In response to the values of $S_i$ and $S_{i-n}$ the following calculations ar performed:

$x_{i-k} - x_{i-n-k}$
$x_{i-k} + x_{i-n-k}$
$-x_{i-k} - x_{i-n-k}$
$-x_{i-k} + x_{i-n-k}$.

The adders—subtractors $30_1$ to $30_n$ are activated to an addition or subtraction mode according to the sign represented by sign bits $S_i$ and $S_{i-n}$. The outputs of adders—subtractors $30_1$ to $30_n$ are connected to the inputs of digital integrators $14_1$ to $14_n$ as in the case in FIG. 3.

The truth table for each of adders—subtractors $30_1$ to $30_n$ is provided in FIG. 7.

Figure 8:
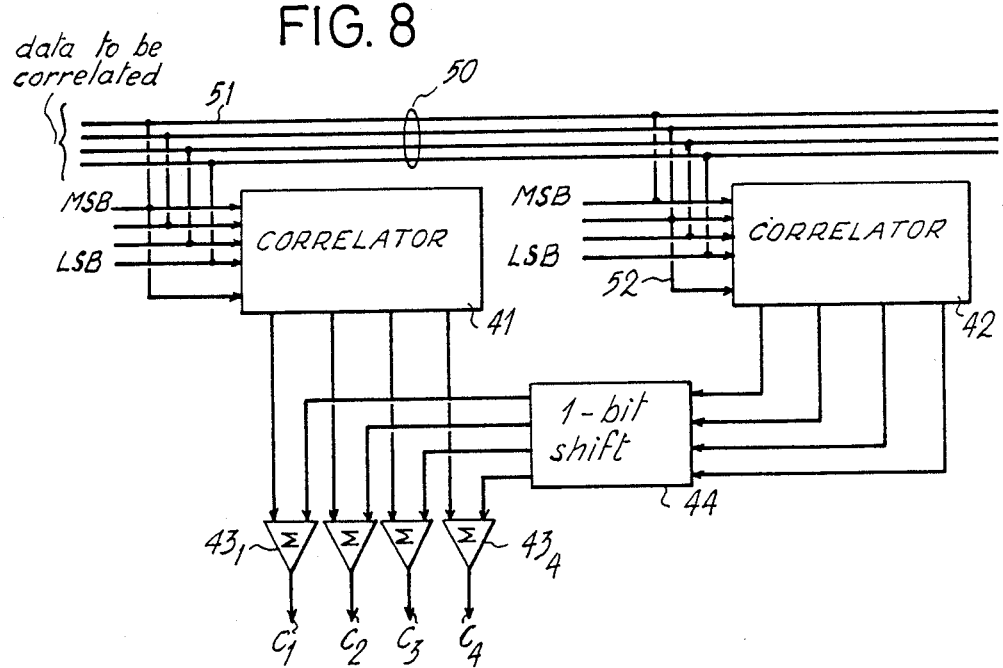
FIG. 8 is a circuit diagram of several correlators connected in parallel to switch from a 4×1 bit correlation to a correlation of 4×2 bits.

FIG. 8 is a block diagram of two correlators 41 and 42 working in parallel, wherein each of the correlators is of the type illustrated in FIG. 7, so q×1 bit; with q=4.

The single bit correlated in correlator 41, derived on lead 51, corresponds to the most significant bit of line 50 transmitting the q bits. The single bit correlated in correlator 42, derived on lead 52, corresponds to the next most significant bit of this line. The outputs of correlator 42, after being shifted one bit in circuit 44, are added with the outputs of correlator 41 in adders 43; this shift corresponds to a multiplication by two of the values of the output signals of correlator 42. In this system a correlation of q×2 bits is obtained with two q×1 bit correlators. The system can be expanded to q×p bits by paralleling p correlators at q×1 bits (p≦q).

In one embodiment of the invention the delayed samples are stored in two shift registers 61 and 62, each having n stages of q bits (FIG. 9a for n=4). Registers 61 and 62 are interconnected as illustrated in FIG. 9b to obtain n autocorrelation coefficients ($C_1$, $C_2$, $C_3$, $C_4$ for n=4).

In FIG. 9c are shown two correlators 63, 64 with four autocorrelation coefficients $C_1$, $C_2$, $C_3$, $C_4$ and $C_5$, $C_6$, $C_7$, $C_8$, working in series to double the number of autocorrelation coefficients calculated. Each correlator contains two shift registers $61_1$, $62_1$, and $61_2$, $62_2$; the first two registers $61_1$, $61_2$ and the second two registers $62_1$, $62_2$ being grouped and connected in series to form two double capacity registers, respectively storing the delayed signals at times $\Delta t$, $2\Delta t$ and the delayed signals at times $(n+1)\Delta t$, $(n+2)\Delta t$, ... $2n\Delta t$. With this system, the correlation units supply p×4 correlation coefficients with serial connection of p correlators.

What I claim is:

1. Apparatus for detecting the occurrence of a periodic signal embedded in noise, including real time means for calculating the autocorrelation functions of the signal and deducing the frequency of the signal from the value of the autocorrelation function coefficients, said apparatus comprising:
  an analog to digital converter for periodically transforming samples of the signal into digital signals, each of the digital signals having at least one bit,
  means for delaying each of said digital signals by a predetermined time interval $\Delta t$ and multiples thereof, said delaying means including a first delay circuit group of n delay circuits for delaying said digital signals by $\Delta t$, $2\Delta t$ $n\Delta t$ and a second delay circuit group of n delay circuits for delaying said digital signals by $(n+1)\Delta t$, $(n+2)\Delta t$, ..., $2n\Delta t$;
  multiplying means including a first multiplying circuit group of n multiplying circuits for multiplying the digital signals derived by said converter by digital output signals of the first delay circuit group and a second multiplying circuit group of n multiplying circuits for multiplying digital signals derived by the last delaying circuit of the first delay circuit group by digital signals derived by the second delay circuit group;

subtractor means for respectively subtracting digital signals representing products derived by the second multiplying circuit group from digital signals representing products derived by the first multiplying circuit group;

integrator means for integrating digital signals representing differences derived by said subtractor means, the signals derived by said integrator means being the coefficients of the autocorrelation function of the input signal;

means for selecting at least one of said coefficients; and comparator means for comparing the selected coefficient with a predetermined threshold, said comparator means deriving an output signal in response to the input signal containing a periodic component.

2. Apparatus according to claim 1 wherein the selecting means selects several coefficients of the autocorrelation function and the comparator means compares the predetermined threshold to the sum of said several coefficients.

3. Apparatus according to claim 1 wherein each of the digital signals consists of one bit, the multiplying circuits of the first and second multiplying circuit groups including first exclusive OR gates, the subtractor means including second exclusive OR gates, the integrator means including direct and reverse counters driven by a clock pulse generator and controlled by signals derived by the second exclusive OR gates.

* * * * *